United States Patent
Palm et al.

(10) Patent No.: US 11,299,073 B2
(45) Date of Patent: *Apr. 12, 2022

(54) DEPLOYABLE DRIVER STATION FOR AN AUTONOMOUS DRIVING VEHICLE

(71) Applicant: Volvo Car Corporation, Gothenburg (SE)

(72) Inventors: Niklas Palm, Gothenburg (SE); Jonas Göthlin, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/983,054

(22) Filed: Aug. 3, 2020

(65) Prior Publication Data
US 2020/0361345 A1   Nov. 19, 2020

Related U.S. Application Data

(63) Continuation of application No. 16/257,292, filed on Jan. 25, 2019, now Pat. No. 10,744,910.

(51) Int. Cl.
| | |
|---|---|
| *B60N 2/20* | (2006.01) |
| *B62D 1/183* | (2006.01) |
| *B60N 2/02* | (2006.01) |
| *B60N 2/12* | (2006.01) |
| *B60N 2/14* | (2006.01) |

(52) U.S. Cl.
CPC ........... *B60N 2/203* (2013.01); *B60N 2/0292* (2013.01); *B60N 2/12* (2013.01); *B60N 2/143* (2013.01); *B62D 1/183* (2013.01)

(58) Field of Classification Search
CPC .......... B60N 2/02; B60N 2/0292; B60N 2/04; B60N 2/06; B60N 2/12; B60N 2/143; B60N 2/203; B60N 2/24; B62D 1/18; B62D 1/183; B62D 1/185
USPC .......................... 296/65.01, 65.09, 65.16, 70
See application file for complete search history.

(56) References Cited

U.S. PATENT DOCUMENTS

| | | | |
|---|---|---|---|
| 6,991,285 B1 * | 1/2006 | Hemenway | B60N 2/203 296/65.01 |
| 9,096,150 B2 | 8/2015 | Cuddihy et al. | |
| 9,199,553 B2 | 12/2015 | Cuddihy et al. | |
| 9,227,531 B2 | 1/2016 | Cuddihy et al. | |

(Continued)

*Primary Examiner* — Jason S Daniels
(74) *Attorney, Agent, or Firm* — Clements Bernard Walker; Christopher L. Bernard

(57) ABSTRACT

A deployable driver station including a seat utilizing both a front-facing driver seat bottom and a coupled rear-facing passenger seat bottom. In a driver configuration, the driver seat bottom is used in a conventional manner, being disposed behind the steering wheel or other steering control and the interior panel, while the passenger seat bottom is disposed more centrally within the passenger compartment. In a passenger configuration, the passenger seat bottom is used like the adjacent rear-facing passenger seat bottom(s), when used, while the driver seat bottom is disposed under the interior panel such that it does not take up space in the passenger compartment. Likewise, the steering wheel or other steering control is disposed under the interior panel. A common two-sided pivoting seat back is alternately used for the driver seat or the passenger seat by pivoting to an appropriate angle for the configuration.

20 Claims, 1 Drawing Sheet

(56) References Cited

U.S. PATENT DOCUMENTS

| | | |
|---|---|---|
| 9,340,126 B2 | 5/2016 | Cuddihy et al. |
| 9,862,403 B1 | 1/2018 | Rouleau et al. |
| 10,150,386 B2 | 12/2018 | Tan |
| 10,457,314 B2 * | 10/2019 | Swamidason .......... B62D 5/005 |
| 10,479,233 B2 * | 11/2019 | Minato ................ B60N 2/0244 |
| 2005/0253433 A1 * | 11/2005 | Brown .................. B60N 2/203 |
| | | 297/283.3 |
| 2017/0267124 A1 * | 9/2017 | Numazawa .............. B60N 2/06 |
| 2017/0341677 A1 | 11/2017 | Buzzard et al. |
| 2019/0152369 A1 * | 5/2019 | Zhao ................... B60N 2/0252 |

\* cited by examiner

DEPLOYABLE DRIVER STATION FOR AN AUTONOMOUS DRIVING VEHICLE

CROSS-REFERENCE TO RELATED APPLICATION

The present disclosure is a continuation (CON) of co-pending U.S. patent application Ser. No. 16/257,292, filed on Jan. 25, 2019, and entitled "DEPLOYABLE DRIVER STATION FOR AN AUTONOMOUS DRIVING VEHICLE," the contents of which are incorporated in full by reference herein.

TECHNICAL FIELD

The present disclosure relates generally to the automotive field. More specifically, the present disclosure relates to a deployable driver station, including a driver seat and steering wheel or other steering control, for an autonomous driving (AD) vehicle.

BACKGROUND

It is typically envisioned that the passenger compartment of full AD vehicles will utilize both front and rear-facing passenger seats, such that vehicle occupancy and passenger comfort can be maximized. For example, one such cab-forward passenger compartment utilizes a front row consisting of three equal-size, rear-facing passenger seats and a back row consisting of three equal-size, front-facing passenger seats, such that six passengers can be accommodated comfortably. Such a cab-forward passenger compartment may utilize large sliding main doors and, optionally, conventional front doors. As this is a full AD vehicle, no driver seat and steering wheel or other steering control are made available for one of the passengers to operate the vehicle.

It is anticipated, however, that legal and practical requirements will mandate and dictate that some sort of driver station, including a driver seat and steering wheel or other steering control, will have to be made available for one of the passengers, emergency personnel, and/or a service person to move the vehicle in an emergency situation, during service, etc. It is also anticipated that this steering wheel or other steering control and the associated acceleration and braking controls will have to, in whole or in part, utilize conventional physical links, as opposed to being drive-by-wire controls alone executed from a mobile application or the like.

Thus, the challenge is to provide a driver station, including a driver seat and steering wheel or other steering control, that is functional when needed, but that does not otherwise unnecessarily intrude into the passenger compartment during normal AD passenger operation. Further, such a driver station should comply with current safety standards in terms of structural integrity, passive and active restraints, air bags, etc.

Several attempts have been made, unsuccessfully, to solve this problem using a specialized swiveling or rotating driver seat that is front-facing when the vehicle is being driven in a conventional manner and rear-facing when the vehicle is being operated in an AD mode. Such convertible seats, however, are bulky, complex, and cost significant passenger space in the passenger compartment. Further, they typically do not address the steering wheel in any manner, opting to use a conventional steering wheel protruding from the instrument panel (IP). A better solution is thus needed.

SUMMARY

The deployable driver station provided herein includes a seat that utilizes both a front-facing driver seat bottom and a coupled rear-facing passenger seat bottom. In a driver configuration, the driver seat bottom is used like a conventional driver seat bottom, being disposed adjacent to and behind the steering wheel or other steering control, the acceleration and braking pedals or other acceleration or braking controls, and the IP, while the passenger seat bottom is disposed more centrally within the passenger compartment. These seat bottoms are collectively translatable within the passenger compartment on conventional tracks, for example. In a passenger configuration, the passenger seat bottom is used like the adjacent rear-facing passenger seat bottom(s), when used, while the driver seat bottom is disposed partially or wholly under or within the IP such that it does not take up space in the passenger compartment. Likewise, the steering wheel or other steering control is disposed partially or wholly under or within the IP such that it does not take up space in the passenger compartment. For example, the steering wheel may translate or telescope under or into the IP. The acceleration and braking pedals or other acceleration or braking controls may also be retracted, or they may simply maintain their positions under the IP. A common two-sided pivoting seat back is provided that can be alternately used for the driver seat or the passenger seat by pivoting to an appropriate angle for the configuration. Optionally, separate head rests are deployed and utilized in each configuration, although a common reversible head rest could also be utilized.

Conversion between the driver seat and the passenger seat may be manually, electromechanically, or electronically actuated via a switch. Appropriate safety systems are provided for both the driver seat and the passenger seat. For example, independent seat belt systems can be provided, with the driver seat belt assembly coupled to the conventional B-pillar or the like and the passenger seat belt assembly coupled to the conventional A-pillar or the like. Independent air bag systems can also be provided, with the driver air bag assembly disposed in the steering wheel, IP, A-pillar, or the like and the passenger air bag assembly disposed in the door, B-pillar, or the like. Preferably, the various air bags are enabled/disabled depending upon the seat configuration being employed.

In one exemplary embodiment, the deployable driver station provided herein includes a vehicle seat including a front-facing driver seat bottom, a rear-facing passenger seat bottom, and a two-sided seat back pivotably coupled between the front-facing driver seat bottom and the rear-facing passenger seat bottom, wherein the front-facing driver seat bottom and the rear-facing passenger seat bottom are collectively adapted to be translated between a passenger configuration in which the front-facing driver seat bottom is disposed one or more of under and within an instrument panel of the vehicle and a driver configuration in which the front-facing driver seat bottom is disposed in a spaced-apart relationship with the instrument panel of the vehicle, and wherein the two-sided seat back is adapted to be pivotably biased towards a front of the vehicle in the passenger configuration and towards a rear of the vehicle in the driver configuration; and a steering control adapted to be retracted one or more of under and into the instrument panel in the passenger configuration and extended from the instrument panel in the driver configuration.

In another exemplary embodiment, the vehicle seat provided herein includes a front-facing driver seat bottom; a rear-facing passenger seat bottom coupled to the front-facing driver seat bottom; and a two-sided seat back pivotably coupled between the front-facing driver seat bottom and the rear-facing passenger seat bottom; wherein the front-facing driver seat bottom and the rear-facing passenger seat bottom are collectively adapted to be translated between a passenger configuration in which the front-facing driver seat bottom is disposed one or more of under and within an instrument panel of the vehicle and a driver configuration in which the front-facing driver seat bottom is disposed in a spaced-apart relationship with the instrument panel of the vehicle; and wherein the two-sided seat back is adapted to be pivotably biased towards a front of the vehicle in the passenger configuration and towards a rear of the vehicle in the driver configuration.

In a further exemplary embodiment, the AD vehicle provided herein includes an instrument panel disposed in a passenger compartment of the vehicle; one or more front rear-facing passenger seats disposed in the passenger compartment of the vehicle; one or more rear front-facing passenger seats disposed in the passenger compartment of the vehicle; a deployable seat disposed adjacent to the one or more front rear-facing passenger seats disposed in the passenger compartment of the vehicle, the deployable seat including a front-facing driver seat bottom, a rear-facing passenger seat bottom, and a two-sided seat back pivotably coupled between the front-facing driver seat bottom and the rear-facing passenger seat bottom, wherein the front-facing driver seat bottom and the rear-facing passenger seat bottom are collectively adapted to be translated between a passenger configuration in which the front-facing driver seat bottom is disposed one or more of under and within the instrument panel and a driver configuration in which the front-facing driver seat bottom is disposed in a spaced-apart relationship with the instrument panel, and wherein the two-sided seat back is adapted to be pivotably biased towards a front of the vehicle in the passenger configuration and towards a rear of the vehicle in the driver configuration; and a steering control adapted to be retracted one or more of under and into the instrument panel in the passenger configuration and extended from the instrument panel in the driver configuration.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF EMBODIMENTS

Again, the deployable driver station provided herein includes a seat that utilizes both a front-facing driver seat bottom and a coupled rear-facing passenger seat bottom. In a driver configuration, the driver seat bottom is used like a conventional driver seat bottom, being disposed adjacent to and behind the steering wheel or other steering control, the acceleration and braking pedals or other acceleration or braking controls, and the IP, while the passenger seat bottom is disposed more centrally within the passenger compartment. These seat bottoms are collectively translatable within the passenger compartment on conventional tracks, for example. In a passenger configuration, the passenger seat bottom is used like the adjacent rear-facing passenger seat bottom(s), when used, while the driver seat bottom is disposed partially or wholly under or within the IP such that it does not take up space in the passenger compartment. Likewise, the steering wheel or other steering control is disposed partially or wholly under or within the IP such that it does not take up space in the passenger compartment. For example, the steering wheel may translate or telescope under or into the IP. The acceleration and braking pedals or other acceleration or braking controls may also be retracted, or they may simply maintain their positions under the IP. A common two-sided pivoting seat back is provided that can be alternately used for the driver seat or the passenger seat by pivoting to an appropriate angle for the configuration. Optionally, separate head rests are deployed and utilized in each configuration, although a common reversible head rest could also be utilized. It should be noted that, although an IP is typically referred to herein, the IP could also be a parcel shelf (PS) or equivalent structure disposed or formed within and defining the passenger compartment of the vehicle.

Conversion between the driver seat and the passenger seat may be manually, electromechanically, or electronically actuated via a switch. Appropriate safety systems are provided for both the driver seat and the passenger seat. For example, independent seat belt systems can be provided, with the driver seat belt assembly coupled to the conventional B-pillar or the like and the passenger seat belt assembly coupled to the conventional A-pillar or the like. Independent air bag systems can also be provided, with the driver air bag assembly disposed in the steering wheel, IP, A-pillar, or the like and the passenger air bag assembly disposed in the door, B-pillar, or the like. Preferably, the various air bags are enabled/disabled depending upon the seat configuration being employed.

Figure 1:
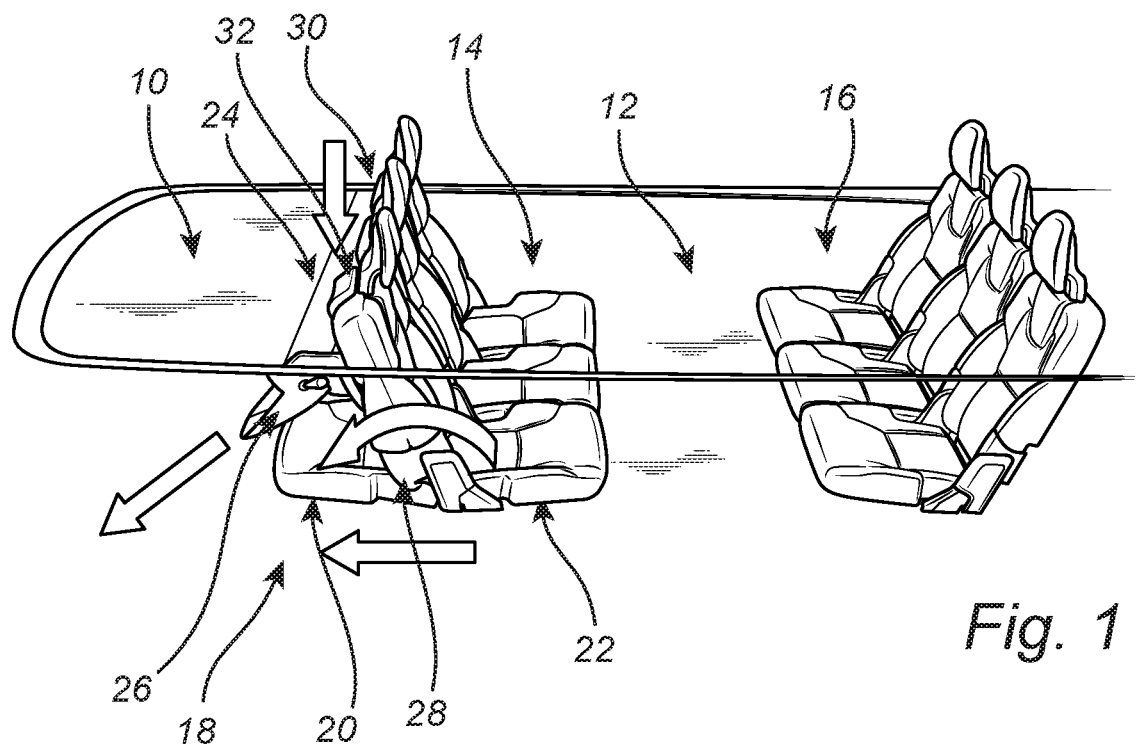
FIG. 1 is a schematic diagram illustrating the passenger compartment of an AD vehicle incorporating the deployable driver station provided herein, the deployable driver station shown in a stowed passenger configuration.

Referring now specifically to FIG. 1, in one exemplary embodiment, a cab-forward vehicle body 10 is illustrated utilizing a passenger compartment 12 generally including three substantially similar rear-facing front seats 14 and three substantially similar front-facing rear seats 16. This arrangement maximizes passenger compartment space utilization and passenger comfort, providing plenty of passenger leg room and allowing for passenger interaction, when desired. It also allows for the inclusion of table, leg and foot rests, and the like. It is envisioned that the arrangement of seats 14,16 is flexible and can be tailored to a given application. Accordingly, modular seats 14,16 may be used, allowing various seat components and functionalities to be mixed and matched. Thus, different numbers and orientations of seats 14,16 may be utilized. In the exemplary embodiment illustrated, the vehicle can utilize conventional front doors and sliding rear doors, for example, and the rear sets may be set back, providing maximum ease of passenger access and passenger comfort once seated. This may represent and AD taxi configuration, for example.

As provided herein, one of the front seats 14 forms part of a deployable driver station 18. This seat 14 includes a front-facing seat bottom 20 coupled to a rear-facing seat bottom 22. The front-facing seat bottom 20 and the rear-facing seat bottom 22 may each be formed in a conventional manner or may be modular in nature, including a cushion carrier, cushion foam, upholstery, and any functional modules in a ready-to-install to a frame package. The front-facing seat bottom 20 and the rear-facing seat bottom 22 are collectively translatable along the floor structure of the vehicle via a base module, conventional seat tracks, or the like. This translatable forwards and rearwards can be manually actuated, electromechanically actuated, or electronically actuated, as is done for conventional seats. The base module(s) can provide each seat bottom 20,22 with individualized height, tilt, extension, heating, cooling, and other functionalities.

In a passenger or AD configuration, the passenger seat bottom 22 is used like the adjacent rear-facing passenger seat bottom(s), while the driver seat bottom 20 is disposed partially or wholly under or within the IP 24 such that it does not take up space in the passenger compartment 12. The driver seat bottom 20 may simply be translated far enough forward that it is conformally nested in the space typically occupied by a driver's legs and feet when he or she is operating the steering wheel 26 or other steering control, the acceleration pedal or other acceleration control, and the braking pedal, or other braking control. It should also be noted that the passenger seat bottom 22 can be integrally formed with an adjacent passenger seat bottom or bottoms in a bench-type configuration, in which case all of the seat bottom will move together. The driver seat bottom 20 and/or the passenger seat bottom 22 can also be foldable, if desired, to save space under the IP and/or within the passenger compartment.

Likewise, in the passenger or AD configuration, the steering wheel 26 or other steering control (such as a joystick in a full drive-by-wire AD implementation) is disposed partially or wholly under or within the IP 24 such that it does not take up space in the passenger compartment. For example, the steering wheel 26 may translate or telescope under or into the IP 24 via a telescoping mechanism, a translation track, and/or an articulated pivot link. The acceleration and braking pedals or other acceleration or braking controls (such as the joystick in the full drive-by-wire AD implementation) may also be retracted, or they may simply maintain their positions under the IP 24 as they typically do not intrude into the passenger compartment 12 anyway.

A common two-sided pivoting seat back 28 is provided that can be alternately used for the driver seat or the passenger seat by pivoting to an appropriate angle for the configuration. Optionally, separate head rests 30,32 are deployed and utilized in each configuration, although a common reversible head rest could also be utilized. For example, in the passenger or AD configuration, the pivoting seat back 28 is tilted slightly towards the front of the vehicle, such that it can be comfortably used by a rear-facing passenger seated in the rear-facing seat bottom 22. The pivoting seat back 28 may be formed in a conventional manner or may be modular in nature, including appropriate front and rear cushion carriers, cushion foams, upholstery, and any functional modules in a ready-to-install to a frame package. In the exemplary embodiment illustrated, a passenger head rest 30 is deployed upwards from the seat back 28 when the passenger seat is used and a driver head rest 32 is deployed upwards from the seat back 28 when the driver seat is used. The unused head rest 30,32 can be retracted or pivoted out of the way, as appropriate. It should also be noted that, in a simplified embodiment, a fixed two-sided seat back can be used in place of the pivoting seat back 28.

Figure 2:
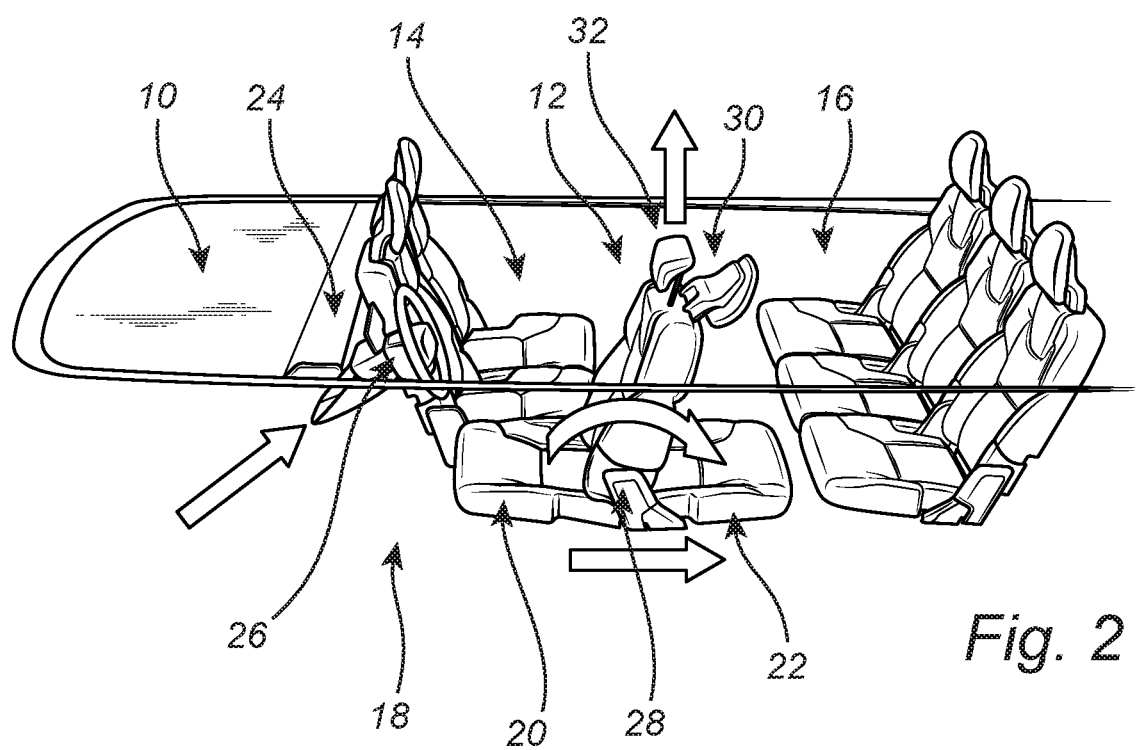
FIG. 2 is a schematic diagram illustrating the passenger compartment of an AD vehicle incorporating the deployable driver station provided herein, the deployable driver station shown in a deployed driver configuration.

Referring now specifically to FIG. 2, in a driver or manual configuration, the driver seat bottom 20 is used like a conventional front-facing driver seat bottom, while the passenger seat bottom 22 is correspondingly disposed centrally within the passenger compartment 12. The driver seat bottom 20 is simply translated far enough rearward that it is usable by a driver when he or she is operating the steering wheel 26 or other steering control, the acceleration pedal or other acceleration control, and the braking pedal, or other braking control.

Likewise, in the driver or manual configuration, the steering wheel 26 or other steering control (such as the joystick in the otherwise full drive-by-wire AD implementation) is disposed within the driver station 18 such that it can be used. For example, the steering wheel 26 may translate or telescope into the driver station 18 via the telescoping mechanism, the translation track, and/or the articulated pivot link. The acceleration and braking pedals or other acceleration or braking controls (such as the joystick in the otherwise full drive-by-wire AD implementation) may also be extended, or they may simply maintain their positions under the IP 24 as they typically do not intrude into the passenger compartment 12 anyway.

Again, the common two-sided pivoting seat back 28 is provided that can be alternately used for the driver seat or the passenger seat by pivoting to an appropriate angle for the configuration. Optionally, separate head rests 30,32 are deployed and utilized in each configuration, although a common reversible head rest could also be utilized. For example, in the driver or manual configuration, the pivoting seat back 28 is tilted slightly towards the rear of the vehicle, such that it can be comfortably used by a front-facing driver seated in the front-facing seat bottom 20. The pivoting seat back 28 may be formed in a conventional manner or may be modular in nature, including appropriate front and rear cushion carriers, cushion foams, upholstery, and any functional modules in a ready-to-install to a frame package. In the exemplary embodiment illustrated, a passenger head rest 30 is deployed upwards from the seat back 28 when the passenger seat is used and a driver head rest 32 is deployed upwards from the seat back 28 when the driver seat is used. The unused head rest 30,32 can be retracted or pivoted out of the way, as appropriate.

Again, conversion between the driver seat and the passenger seat may be manually, electromechanically, or electronically actuated via a switch. Appropriate safety systems are provided for both the driver seat and the passenger seat. For example, independent seat belt systems can be provided, with the driver seat belt assembly coupled to the conventional B-pillar or the like and the passenger seat belt assembly coupled to the conventional A-pillar or the like. Independent air bag systems can also be provided, with the driver air bag assembly disposed in the steering wheel, IP, A-pillar, or the like and the passenger air bag assembly disposed in the door, B-pillar, or the like. Preferably, the various air bags are enabled/disabled depending upon the seat configuration being employed.

Thus, the driver station provided herein, including the driver seat and steering wheel or other steering control, is functional when needed, but does not otherwise unnecessarily intrude into the passenger compartment during normal AD passenger operation. The driver station complies with current safety standards in terms of structural integrity, passive and active restraints, air bags, etc. The driver station avoids the use of a swiveling or rotating driver seat that is front-facing when the vehicle is being driven in a conventional manner and rear-facing when the vehicle is being operated in an AD mode. Such convertible seats are bulky, complex, and cost significant passenger space in the passenger compartment. Further, they typically do not address the steering wheel in any manner, opting to use a conventional steering wheel protruding from the IP. The partially-stowable two-sided driver/passenger seat bottom, pivoting two-sided driver/passenger seat back, and stowable steering wheel/control provided herein address these problems in a simple and effective manner.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A deployable driver station, comprising: a vehicle seat comprising a front-facing driver seat bottom, a rear-facing passenger seat bottom, and a two-sided seat back fixedly or pivotably coupled between the front-facing driver seat bottom and the rear-facing passenger seat bottom, wherein the front-facing driver seat bottom and the rear-facing passenger seat bottom are collectively adapted to be translated between a passenger configuration in which the front-facing driver seat bottom is disposed one or more of under and within an interior panel of the vehicle and a driver configuration in which the front-facing driver seat bottom is disposed in a spaced-apart relationship with the interior panel of the vehicle, and wherein, when pivotable, the two-sided seat back is adapted to be pivotably biased towards a front of the vehicle in the passenger configuration and towards a rear of the vehicle in the driver configuration.

2. The deployable driver station of claim 1, wherein the two-sided seat back comprises a passenger head rest that is adapted to extend vertically from the seat back and support a head of a passenger seated on the rear-facing passenger seat bottom in the passenger configuration.

3. The deployable driver station of claim 1, wherein the two-sided seat back comprises a driver head rest that is adapted to extend vertically from the seat back and support a head of a driver seated on the front-facing driver seat bottom in the driver configuration.

4. The deployable driver station of claim 1, wherein the two-sided seat back comprises a two-sided head rest that is adapted to extend vertically from the seat back and alternately support a head of a passenger seated on the rear-facing passenger seat bottom in the passenger configuration and a head of a driver seated on the front-facing driver seat bottom in the driver configuration.

5. The deployable driver station of claim 1, further comprising a steering control adapted to be retracted one or more of under and into the interior panel in the passenger configuration and extended from the interior panel in the driver configuration.

6. The deployable driver station of claim 1, further comprising a passenger safety belt assembly and a passenger air bag assembly coupled to the vehicle seat and adapted to be used by a passenger seated on the rear-facing passenger seat bottom in the passenger configuration.

7. The deployable driver station of claim 1, further comprising a driver safety belt assembly and a driver air bag assembly coupled to the vehicle seat and adapted to be used by a driver seated on the front-facing driver seat bottom in the driver configuration.

8. A vehicle seat, comprising:
a front-facing driver seat bottom;
a rear-facing passenger seat bottom coupled to the front-facing driver seat bottom;
a two-sided seat back fixedly or pivotably coupled between the front-facing driver seat bottom and the rear-facing passenger seat bottom; and
a head rest coupled to the two-sided seat back;
wherein the front-facing driver seat bottom and the rear-facing passenger seat bottom are collectively adapted to be translated between a passenger configuration in which the front-facing driver seat bottom is disposed one or more of under and within an interior panel of the vehicle and a driver configuration in which the front-facing driver seat bottom is disposed in a spaced-apart relationship with the interior panel of the vehicle; and
wherein, when pivotable, the two-sided seat back is adapted to be pivotably biased towards a front of the vehicle in the passenger configuration and towards a rear of the vehicle in the driver configuration.

9. The vehicle seat of claim 8, wherein the head rest comprises a passenger head rest that is adapted to extend vertically from the seat back and support a head of a passenger seated on the rear-facing passenger seat bottom in the passenger configuration, wherein the passenger head rest is retractable or pivotable into a stored position when not in use by the passenger in the driver configuration.

10. The vehicle seat of claim 8, wherein the head rest comprises a driver head rest that is adapted to extend vertically from the seat back and support a head of a driver seated on the front-facing driver seat bottom in the driver configuration, wherein the driver head rest is retractable or pivotable into a stored position when not in use by the driver in the passenger configuration.

11. The vehicle seat of claim 8, wherein the two-sided seat back comprises a two-sided head rest that is adapted to extend vertically from the seat back and alternately support a head of a passenger seated on the rear-facing passenger seat bottom in the passenger configuration and a head of a driver seated on the front-facing driver seat bottom in the driver configuration.

12. The vehicle seat of claim 8, further comprising a passenger safety belt assembly and a passenger air bag assembly coupled to the vehicle seat and adapted to be used by a passenger seated on the rear-facing passenger seat bottom in the passenger configuration.

13. The vehicle seat of claim 8, further comprising a driver safety belt assembly and a driver air bag assembly coupled to the vehicle seat and adapted to be used by a driver seated on the front-facing driver seat bottom in the driver configuration.

14. An autonomous driving vehicle, comprising:
an interior panel disposed in a passenger compartment of the vehicle;
one or more front rear-facing passenger seats disposed in the passenger compartment of the vehicle;
one or more rear front-facing passenger seats disposed in the passenger compartment of the vehicle; and
a deployable seat disposed adjacent to the one or more front rear-facing passenger seats disposed in the passenger compartment of the vehicle, the deployable seat comprising a front-facing driver seat bottom, a rear-facing passenger seat bottom, and a two-sided seat back fixedly or pivotably coupled between the front-facing driver seat bottom and the rear-facing passenger seat bottom, wherein the front-facing driver seat bottom and the rear-facing passenger seat bottom are collectively adapted to be translated between a passenger configuration in which the front-facing driver seat bottom is disposed one or more of under and within the interior panel and a driver configuration in which the front-facing driver seat bottom is disposed in a spaced-apart relationship with the interior panel, and wherein, when pivotable, the two-sided seat back is adapted to be pivotably biased towards a front of the vehicle in the passenger configuration and towards a rear of the vehicle in the driver configuration.

15. The autonomous driving vehicle of claim 14, wherein the two-sided seat back comprises a passenger head rest that is adapted to extend vertically from the seat back and support a head of a passenger seated on the rear-facing passenger seat bottom in the passenger configuration.

16. The autonomous driving vehicle of claim 14, wherein the two-sided seat back comprises a driver head rest that is adapted to extend vertically from the seat back and support a head of a driver seated on the front-facing driver seat bottom in the driver configuration.

17. The autonomous driving vehicle of claim 14, wherein the two-sided seat back comprises a two-sided head rest that is adapted to extend vertically from the seat back and alternately support a head of a passenger seated on the rear-facing passenger seat bottom in the passenger configuration and a head of a driver seated on the front-facing driver seat bottom in the driver configuration.

18. The autonomous driving vehicle of claim 14, further comprising a steering control adapted to be retracted one or more of under and into the interior panel in the passenger configuration and extended from the interior panel in the driver configuration.

19. The autonomous driving vehicle of claim 14, further comprising a passenger safety belt assembly and a passenger air bag assembly coupled to the vehicle seat and adapted to be used by a passenger seated on the rear-facing passenger seat bottom in the passenger configuration.

20. The autonomous driving vehicle of claim 14, further comprising a driver safety belt assembly and a driver air bag assembly coupled to the vehicle seat and adapted to be used by a driver seated on the front-facing driver seat bottom in the driver configuration.

* * * * *